United States Patent
Chiang (10) Patent No.: US 6,619,875 B2
(45) Date of Patent: Sep. 16, 2003

(54) CONNECTION APPARATUS FOR AN ARTIFICIAL MODEL

(76) Inventor: Jung-Chang Chiang, 4F-1, No. 100, Tien-Yu Street, Taipei (TW)

( * ) Notice: Subject to any disclaimer, the term of this patent is extended or adjusted under 35 U.S.C. 154(b) by 0 days.

(21) Appl. No.: 09/888,853

(22) Filed: Jun. 25, 2001

(65) Prior Publication Data

US 2002/0197105 A1 Dec. 26, 2002

(51) Int. Cl.[7] .............................................. F16B 21/16
(52) U.S. Cl. ...................... 403/322.2; 403/52; 403/61; 403/328; 403/374.1
(58) Field of Search ............................ 403/322.2, 322.1, 403/322.3, 52, 59, 60, 61, 65, 119, 328, 321, 374.1; 411/437, 433; 223/66, 68, 12; 446/97, 101, 373, 375–376, 378

(56) References Cited

U.S. PATENT DOCUMENTS

| | | | | |
|---|---|---|---|---|
| 3,117,484 A | * | 1/1964 | Myers | ......................... 411/348 |
| 4,453,449 A | * | 6/1984 | Hollmann | ................. 89/1.806 |
| 4,477,121 A | * | 10/1984 | Atkins | ......................... 301/112 |
| 6,331,091 B2 | * | 12/2001 | Cross | ...................... 403/322.2 |

* cited by examiner

Primary Examiner—Lynne H. Browne
Assistant Examiner—G M Collins
(74) Attorney, Agent, or Firm—Connolly Bove Lodge & Hutz, LLP (57) ABSTRACT

A connection apparatus for an artificial model includes a resilient device and a post device. The resilient device has a hollow shaft extending upward from the fixing disk thereof to fit with a sleeve disposed outside the hollow shaft. A plurality of balls are attached to the hollow shaft and retained between the hollow shaft and the sleeve. The post device further includes a flange and an upright post. The upright post is inserted into the hollow shaft with the round top thereof passing over the balls such that the resilient device can join with the post device. Once the push lever is pushed with the slant parts thereof pressing the sleeve to slide the fixing disk forward, the annular projection section of the sleeve may slide away the balls to release the balls from the recess ring on the push rod such that the post is taken out from the hollow shaft to disengage the post device from the resilient device.

6 Claims, 8 Drawing Sheets

( PRIOR ART )

CONNECTION APPARATUS FOR AN ARTIFICIAL MODEL

BACKGROUND OF THE INVENTION

1. Field of the Invention

The present invention relates to a connection apparatus for an artificial model, and, particularly, to a connection apparatus, which makes an artificial model be detachably fixed easily and firmly and makes the joining lines on the model be concealed properly during fashion exhibition.

2. Description of Related Art

Figure 9:
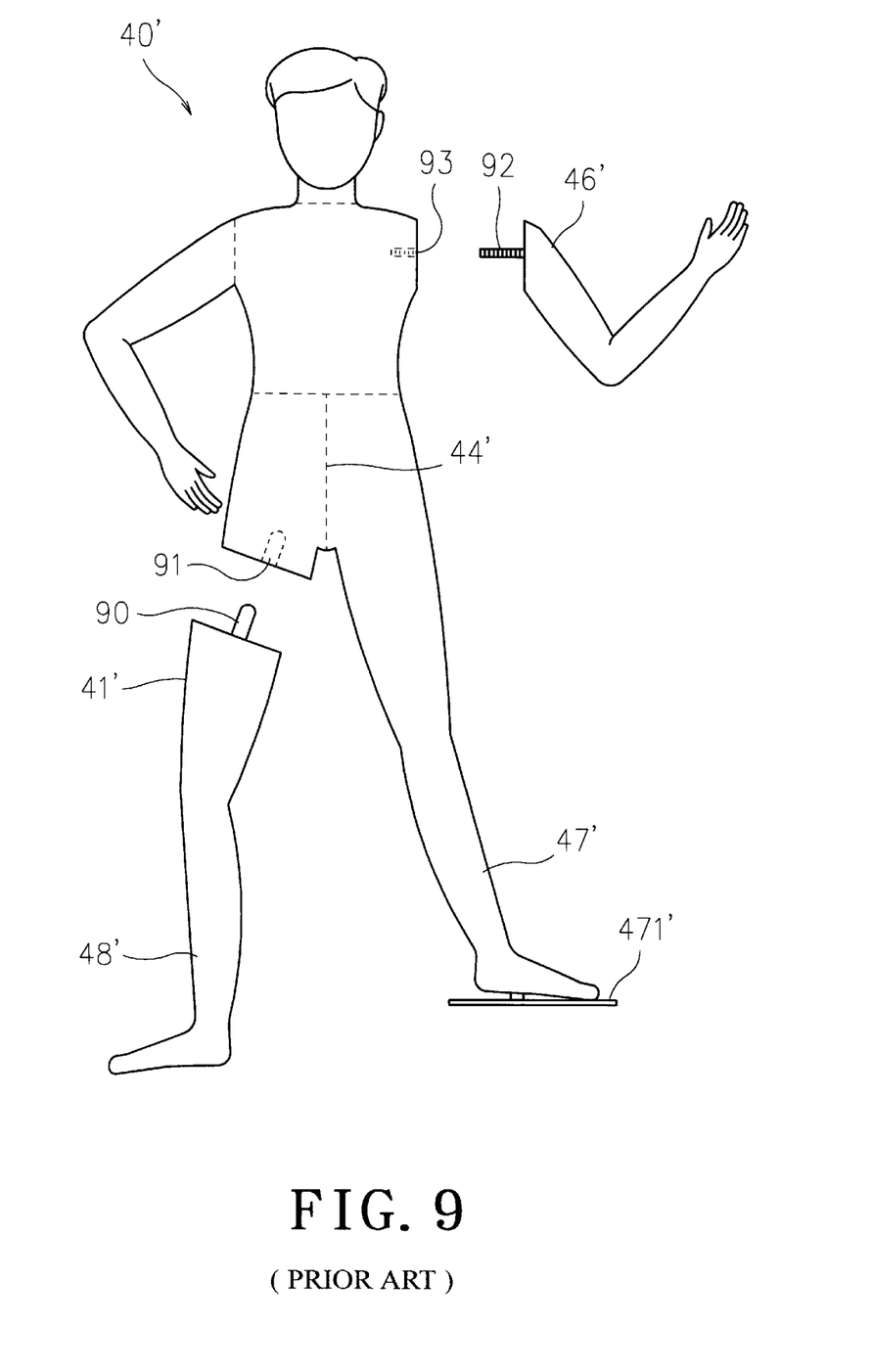
FIG. 9 is diagrammatic view illustrating a conventional model with assembled parts thereof.

Referring to FIG. 9, the conventional artificial model 40' at the lower part thereof usually provides a leg 47' is fixedly attached to a stationary base 471' and another leg 48' is detachable for a pair of trousers being put on or taken off. A conventional way of connecting the leg part of the model provides a support stem 90 and a fitting hole 91 for engaging with each other. Because of a structural limitation of the conventional connecting device, the divided line has to be a straight line such that the divided line may expose as soon as a smaller sized of suit, such as swimming suit, or underwear, is put on. Apparently, it is unpleasing to the eye once the dividing line is left in a state of revealing. Besides, although it is simple for the conventional connection way to be performed, it is easy to be detached after a slight impact. Moreover, the model with the conventional connection device is unable to be hung in order to keep the state of connection so that there is a limit while the connection is used. Next, the connecting parts may turn axially with respect to the support stem 90 and provides an unfavorable connection. Another one of the conventional ways is a threaded screw is used for engaging with a threaded hole. Taking the arm 46' as an example, the arm 46' is embedded a screw 92 and the body is provided with a threaded hole 93. When the arm 46' is assembled or disassembled from the body of the model 40', the arm 46' has to be rotated so as to fasten or unfasten the arm 46'. It is known that the model has a size similar to our body and it is tedious job to turn the arm 46'. Similarly, it is harder if the thigh 41' is turned in order to perform assembling or disassembly the thigh. A further conventional way is to divide the center of the lower part on the model 40' such as the central divided line 44' shown in FIG. 9. But, it is very hard to perform the fitting or detaching job actually. The conventional ways of connection devices basically is an embedded type of connection, that is, the connection device is integrally with the model, and it has to be discarded as soon as the connection device is out of order so that it is costly.

SUMMARY OF THE INVENTION

A main object of the present invention is to provide a connection apparatus for an artificial model, which can be performed to connect with any spot of the thigh and obtain a curve dividing line such that the dividing line may not expose unpleasantly at the time of exhibiting swimming suit or underwear.

Another object of the present invention is to provide a connection apparatus for an artificial model, which can be detachably fixed to the model flexibly so that a connection job can be performed easily to save a lot of labor and time.

A further object of the present invention to provide a connection apparatus for an artificial model, which is fastened to the model by way of screw thread such that damaged parts thereof can be replaced instead of replacing a new model so that the cost can be saved.

A further object of the present invention to provide a connection apparatus for an artificial model, which offers an urged connection way with elasticity such that a firm connection can be obtained and it is not possible for connection part to be detached in case of impact.

BRIEF DESCRIPTION OF THE DRAWINGS

The other objects and features of the present invention can be more fully understood by reference to the following description of preferred embodiments and accompanying drawing, in which.

DETAILED DESCRIPTION OF THE PREFERRED EMBODIMENTS

Figure 1:
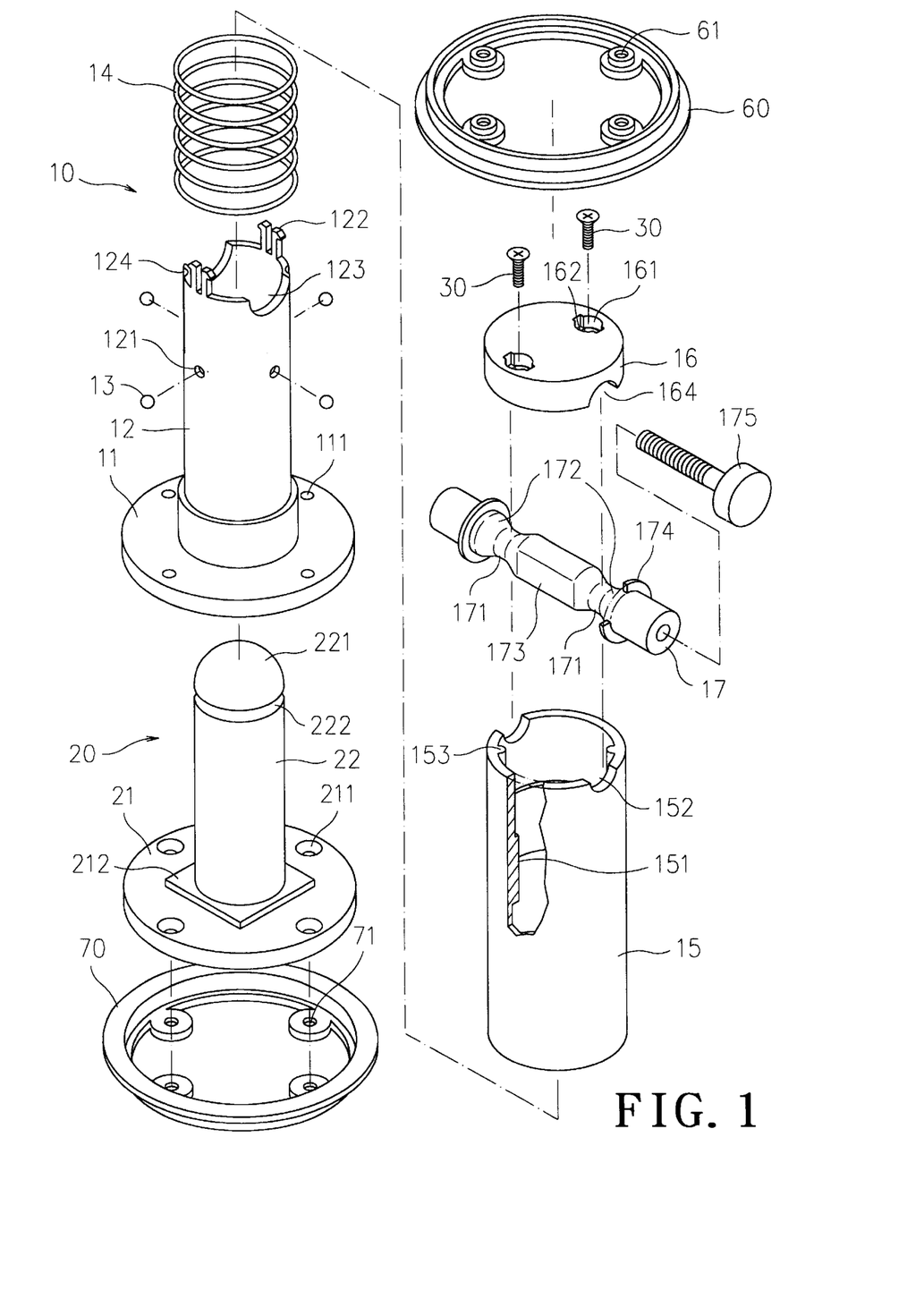
FIG. 1 is an exploded perspective view of a connection apparatus for an artificial model according to the present invention.
Figure 2:
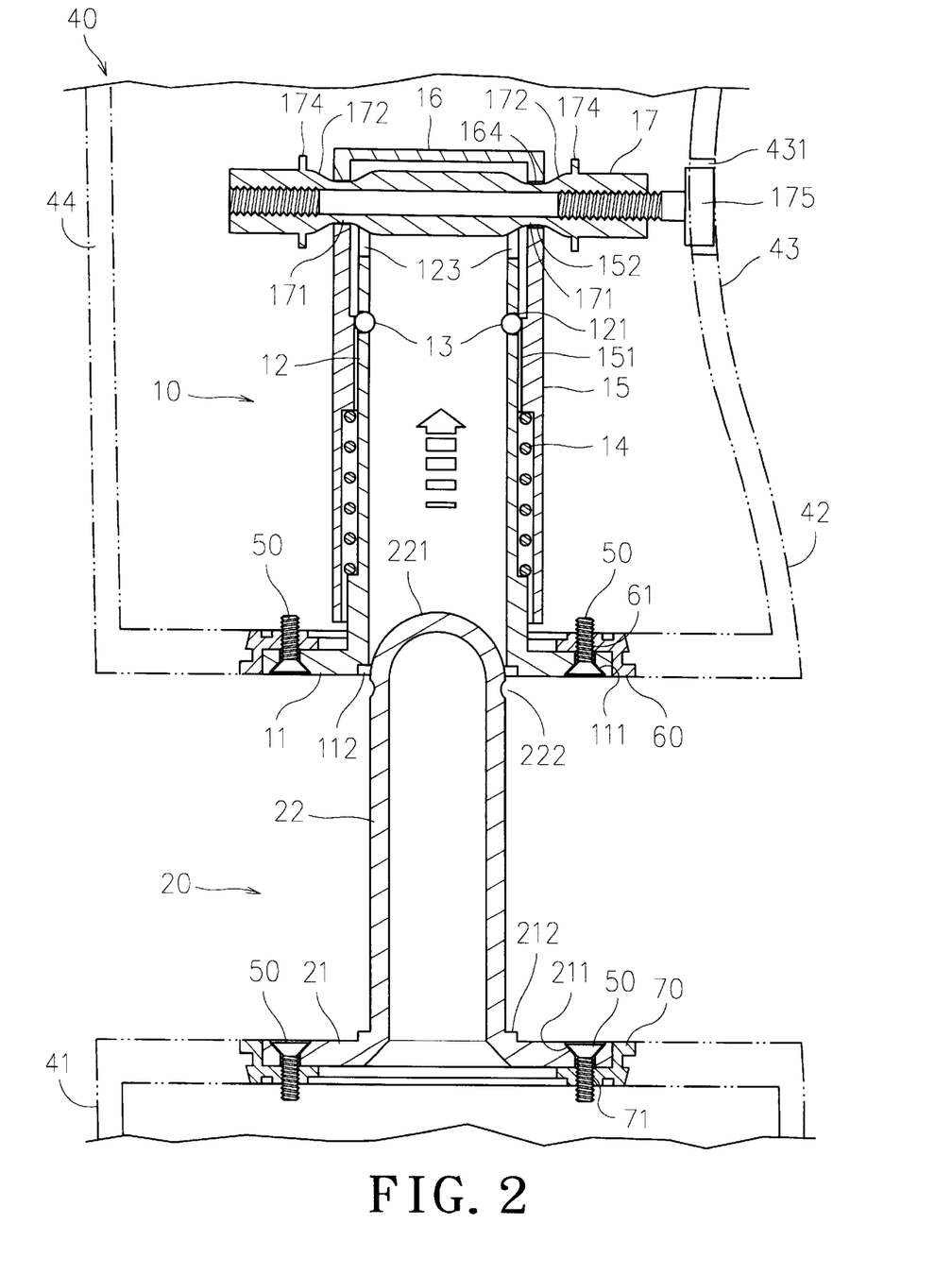
FIG. 2 is a sectional view of a resilient device of the present invention being associated with a projection device.
Figure 3:
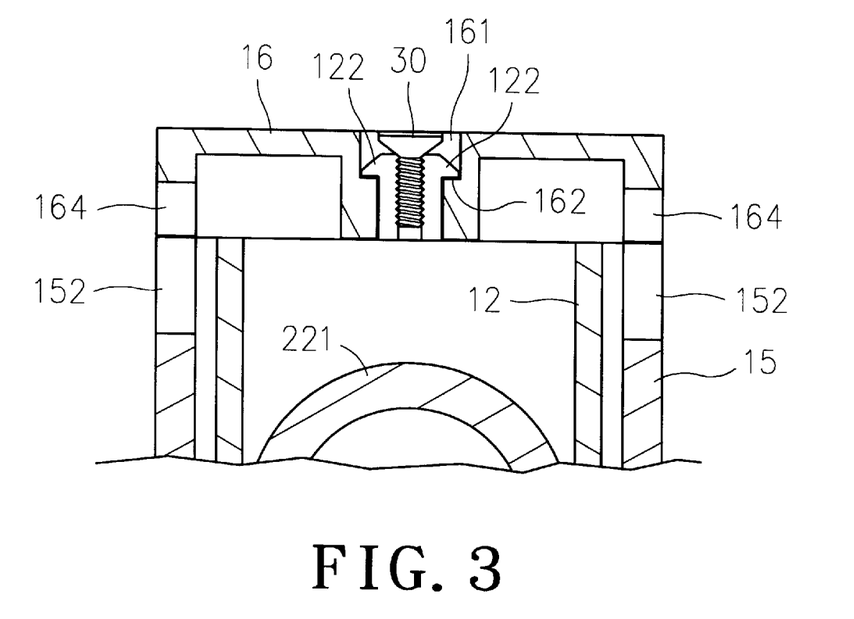
FIG. 3 is a sectional view illustrating a casing engaging with a hollow shaft of the present invention.

Referring to FIGS. 1 to 3, a connection apparatus for an artificial model according to the present invention is used for an exhibited pattern with a shape of human body such that it is possible for joining the neck part, the arms and legs, and the waist part thereof respectively. The connection apparatus of the present invention provides a resilient device 10 and the resilient device 10 further has a fixing disk 11 with a plurality of fixing holes 111 disposed circumferentially. An upper base 60 is arranged to receive the fixing disk 11 and has a plurality of engaging holes 61 corresponding to the fixing holes 111 so that the fixing disk 11 can be fastened to the upper base 60 by way of screws 50 and the upper base 60 is formed to fixedly attached to the model 40 while in use.

A hollow shaft 12 extends through the fixing disk 11 with a plurality of apertures 121 circumferentially disposed at the upper part of the hollow shaft 12. Each aperture 121 is arranged to receive a ball 13 and it is preferable that the ball 13 is a steel ball. The ball 13 is provided with a diameter greater than the wall thickness of the hollow shaft 12 so that the ball 13 protrudes outward from both the outer and the inner wall surfaces of the hollow shaft 12 as soon as the ball 13 is inserted into the respective aperture 121 as shown in FIG. 2.

An elastic element 14 is provided to surround the hollow shaft 12 and rest at the lower part of the hollow shaft 12, and the elastic element 14 can be a compression spring. A sleeve 15 surrounds and fits with the hollow shaft 12 such that an annular projection section 151 on the inner surface is in a state of biasing against the spring element 14. Due to the resilient force of the elastic element 14, the sleeve 15 is in a state of being suspended in the air. The ball 13 is retained between the projection part 151 and the hollow shaft 12 as shown in FIG. 2. In order to avoid sleeve 15 turning after fitting with the hollow shaft 12, the sleeve 15 at the inner wall surface thereof provides a plurality of longitudinal ribs 153 along the axial direction thereof and the hollow shaft 12 at the outer surface thereof provides a plurality of longitudinal recess 124 corresponding to the ribs 153.

An upper cover 16 is disposed on the sleeve 15 and provides two opposite engaging holes 161 and the hollow shaft 12 at the end thereof extends two opposite upward engaging hook pairs 122 corresponding to the engaging holes 161. Each hook pair 122 provides two parallel engaging sticks and each engaging stick has a hook end. Each engaging hole 161 at the inner wall thereof provides two opposite engaging steps 162 to engage with the hook ends on the hook pair 122. As soon as the hook pairs 122 engage with the engaging holes 161, a screw 30 can be inserted into the engaging holes 161 respectively and stays between the two parallel engaging sticks of each hook pair 122 to result in a state of being urged tightly as shown in FIG. 3. In this way, the upper cover 16 can be secured to the hollow shaft 12 firmly.

Figure 4:
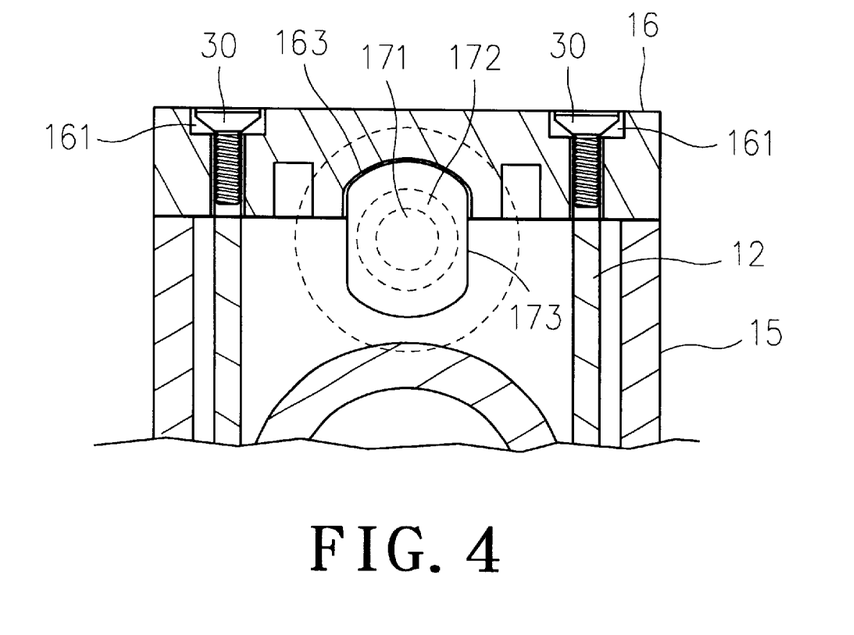
FIG. 4 is a sectional view illustrating a casing being associated with push rod of the present invention.

Moreover, referring FIG. 4 and accompanying with FIGS. 1 and 2 again, a push lever 17 is disposed under the upper cover 16. The push lever 17 has at least a neck part 171 next to both end thereof respectively and the neck part 171 at both lateral sides thereof has a slant part 172. A respective stop ring 174 is arranged near both ends of the push lever 17 beside the slant part 172. The push lever 17 at the middle section thereof has two opposite flat surfaces 173 extend along the axis thereof, and the upper cover 16 provides a fitting part 163 corresponding to the flat surfaces 173. The upper cover 16 and the sleeve 15 provide a curve recess 164, 152 respectively to correspond to the neck parts 171 such that the curve recesses 164, 152 can fit with the neck parts 171 as soon as the upper 15 cover 16 and the sleeve 15 sandwich the push lever 17 as shown in FIG. 2. The hollow shaft 12 also has a curve part 123 corresponds to the position of the push lever 17 and the curvature of the curve part 123 is properly arranged so as to keep away from the movement of the push lever 17. Due to the fitting part 163, the push lever 17 is unable to rotate axially as shown in FIG. 4. The push lever 17 at an end thereof engages with an adjustable bolt 175 such that an outward extending length of the push lever 17 can be adjusted by way of turning the bolt 175 to be accommodated with the size of the model.

Referring to FIGS. 1 and 2 again, the connecting device for an artificial model according to the present invention further comprises a central post device 20 and the post device 20 has a fixing flange 21 with a plurality of fixing holes 211 and an upright central post 22 extending from the flange 21. The post 22 has an outer diameter slightly less than the inner diameter of the hollow shaft 12 with a round upper end 221. A annular recess ring 222 is provided on the post 22 next to the round upper end 221.

A lower base 70, which has a configuration identical with the upper base 60, is provided to join with the flange 21 and is formed to fixedly attach to the model 40 too. A plurality of fixing holes 71 are provided in the lower base 70 corresponding to the fixing holes 211 on the flange 21 and the fixing flange 21 can be received in the lower base 70 and fastened to the lower base 70 by way of screws 50 passing through aligned fixing holes 211, 71 as shown in FIG. 2. It is noted that the upper base 60 and the lower base 70 are oppositely disposed to each other as soon as both of them are fixed to the model 40.

Figure 5:
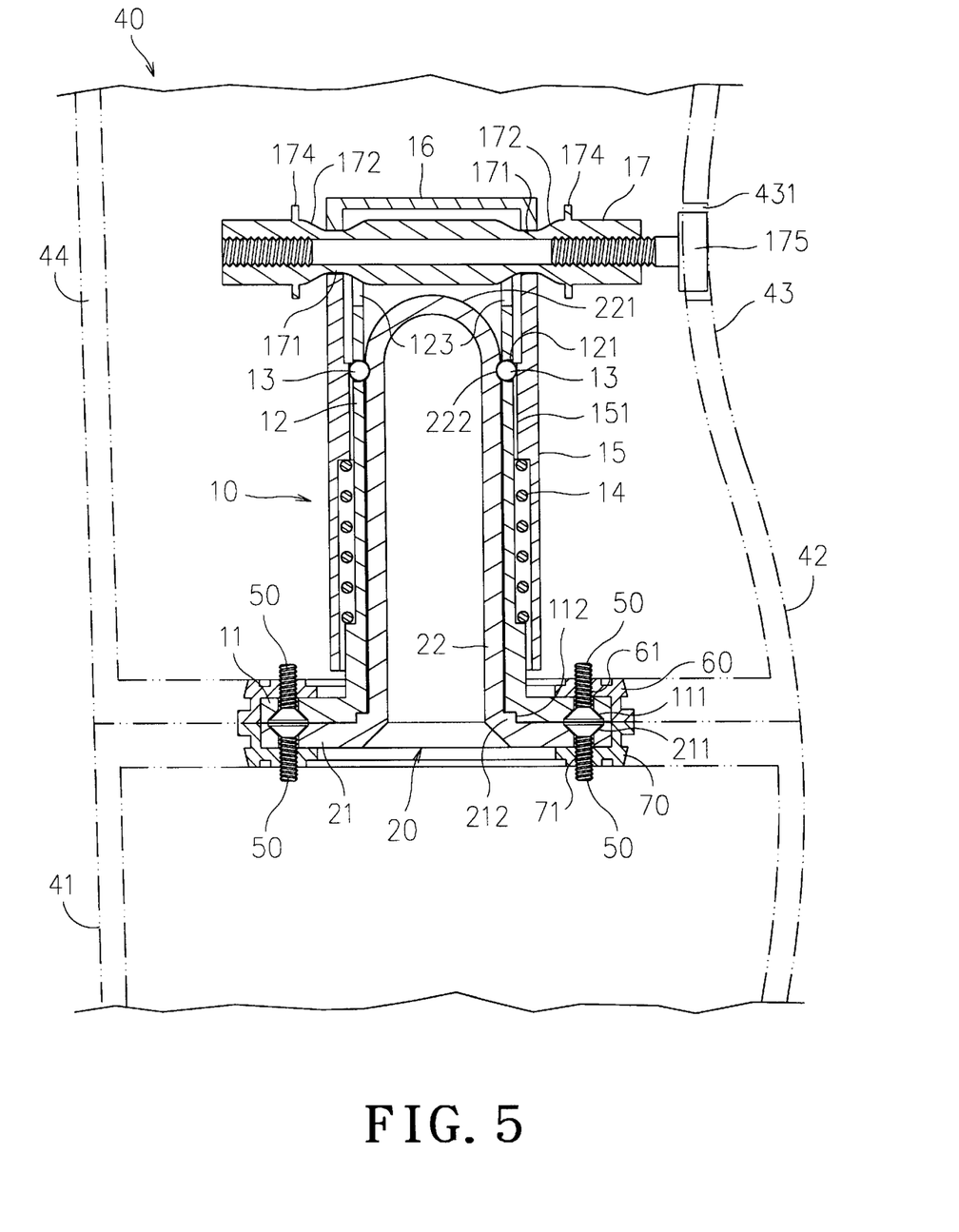
FIG. 5 is sectional view of the connecting device after assembly.
Figure 6:
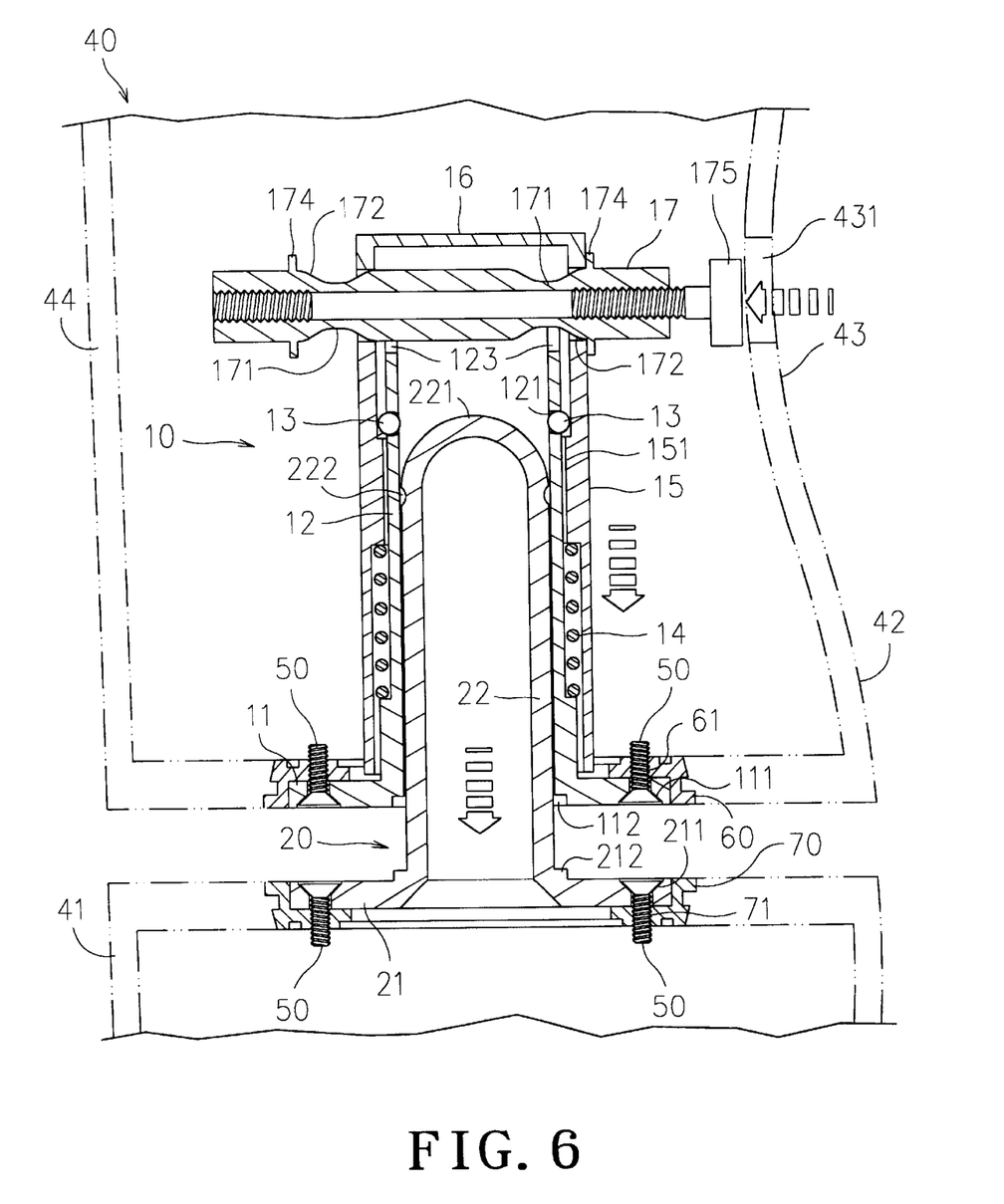
FIG. 6 is a sectional view illustrating the projection device being in a state of detaching the resilient device.

Referring to FIGS. 5 and 6, and accompanying with FIG. 2 again, the connecting device for an artificial model according to the present invention can be used for connecting with a thigh part 41 and a buttock part 42 of the model 40 respectively. Once the fixing disk 11 has engaged with the upper base 60, the resilient device 10 can be fixed to the buttock part 42, i.e., the upper connection part and the push lever 17 with the adjustable bolt 175 is approximately disposed at a waist part 43. A hole 431 is located at the waist part 43 to correspond to the adjustable bolt 175 such that the adjustable bolt 175 can be operated so as to change the position of the push lever 17 properly. In case of a small sized model, it is not necessary to use the adjustable bolt 175 due to having a shorter distance between the waist part 43 and a abdomen part 44. Furthermore, the central post device 20 can be fixedly attached to the thigh part 41, i.e., the lower connection part as soon as the flange 21 is fastened to the lower base 70, and the post 22 is inserted into the hollow shaft 12 in a way of passing over the ball 13 locating at the wall of the hollow shaft 12 smoothly due to the round end 221 of the post 22. In this way, the ball 13 can be located at the recess ring 222 on the post 22, and the resilient device 10 and the post device 20 can join with each other integrally as shown in FIG. 5. Once the adjustable bolt 175 or the push lever is pressed, the slants part 172 at both lateral sides of the neck part 171 push the sleeve 15 to slide toward the fixing disk 11 of the resilient device 10 such that the inner projection part 151 of the sleeve 15 can slide away the ball 13 to release from the recess ring 222 on the post 22. In this way, the post 22 can be taken out from the hollow shaft 12 to separate the resilient device 10 and the post device 20 as shown in FIG. 6. The push lever 17 has the stop plate 174 to prevent the adjustable bolt 175 from being presses excessively so that the push lever 17 may not loose apart from the original position.

Referring to FIGS. 1 and 2, the fixing disk 11 of the resilient device 10 can engage with the flange 21 of the post device 20 by way of a quadrilateral recess 112 at the bottom of the fixing disk 11 and a quadrilateral protrusion 212 on the flange 21 of the post device 20. Because the quadrilateral recess 112 is arranged to correspond to the quadrilateral protrusion 212, the quadrilateral recess 112 and the quadrilateral protrusion 212 can retain each other as soon as the resilient device 10 and post device 20 engage with each other such that it is not possible for the fixing disk 11 and the flange 21 to rotate relatively as shown in FIG. 5. It is noted that the recess 112 and the protrusion 212 are not limited to be provided with a quadrilateral shape, and it is possible to adopt other suitable shapes instead regardless the quadrilateral shape offers a better effect of retaining and makes the fabrication of the recess 112 and the protrusion 212 easily.

Figure 7:
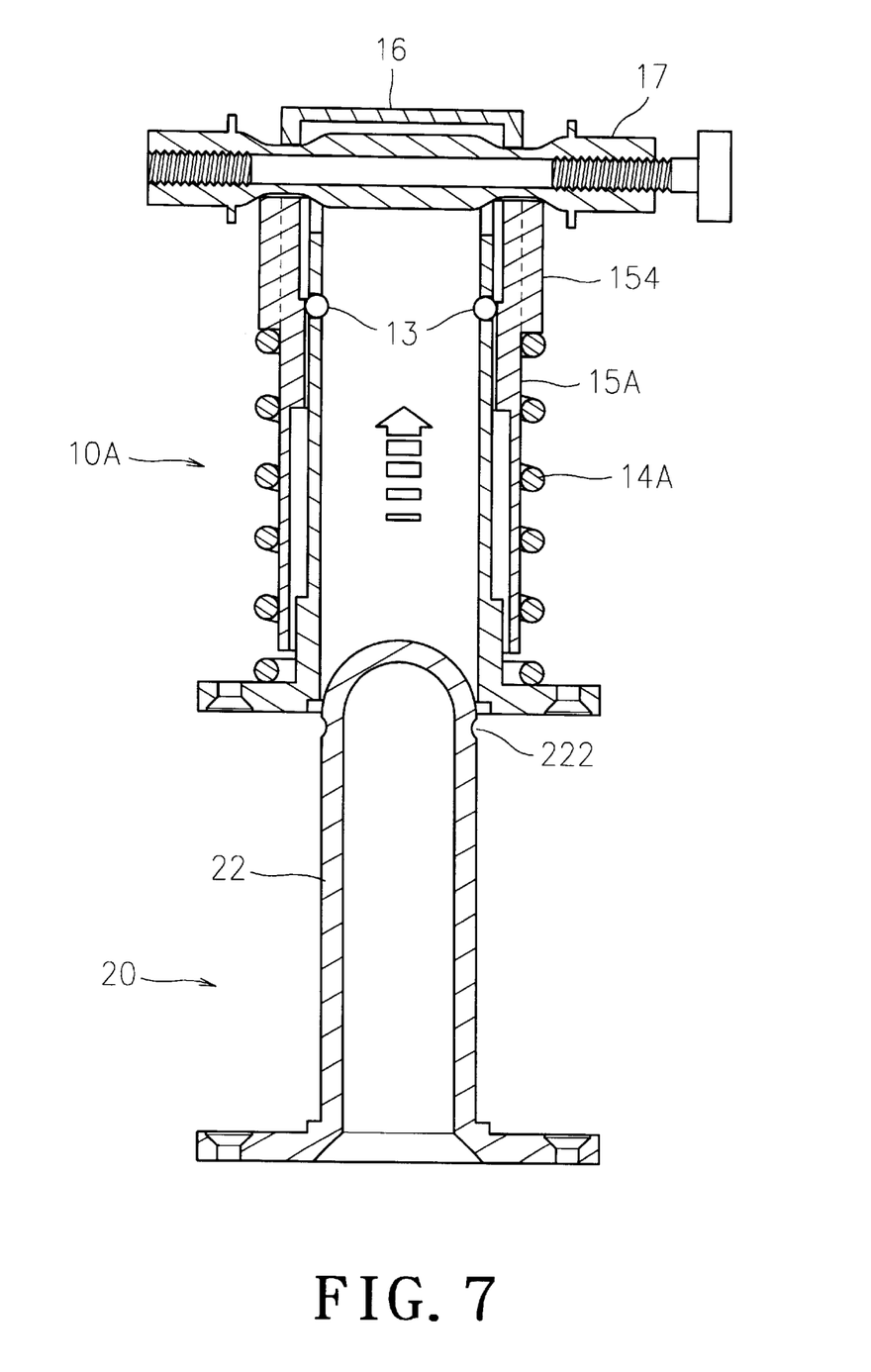
FIG. 7 is a sectional view of the resilient device in another embodiment thereof.

Moreover, please referring to FIG. 7, a resilient device 10A provides a sleeve 15A with a plurality of outer ribs 154 and an elastic element 14A is disposed under the outer ribs 154 at the bottom thereof. As contrasted with the resilient device 10 shown in FIG. 2, the elastic element 14A is disposed to surround the sleeve 15A so that the outer diameter of the elastic element 14A can be increased, that is, the elastic element 14A with a larger size can be used so as to strengthen a restraining force to the ball 13 and increase the bonding force for engaging the ball 13 to the recess ring 222 on the post device 20.

Figure 8:
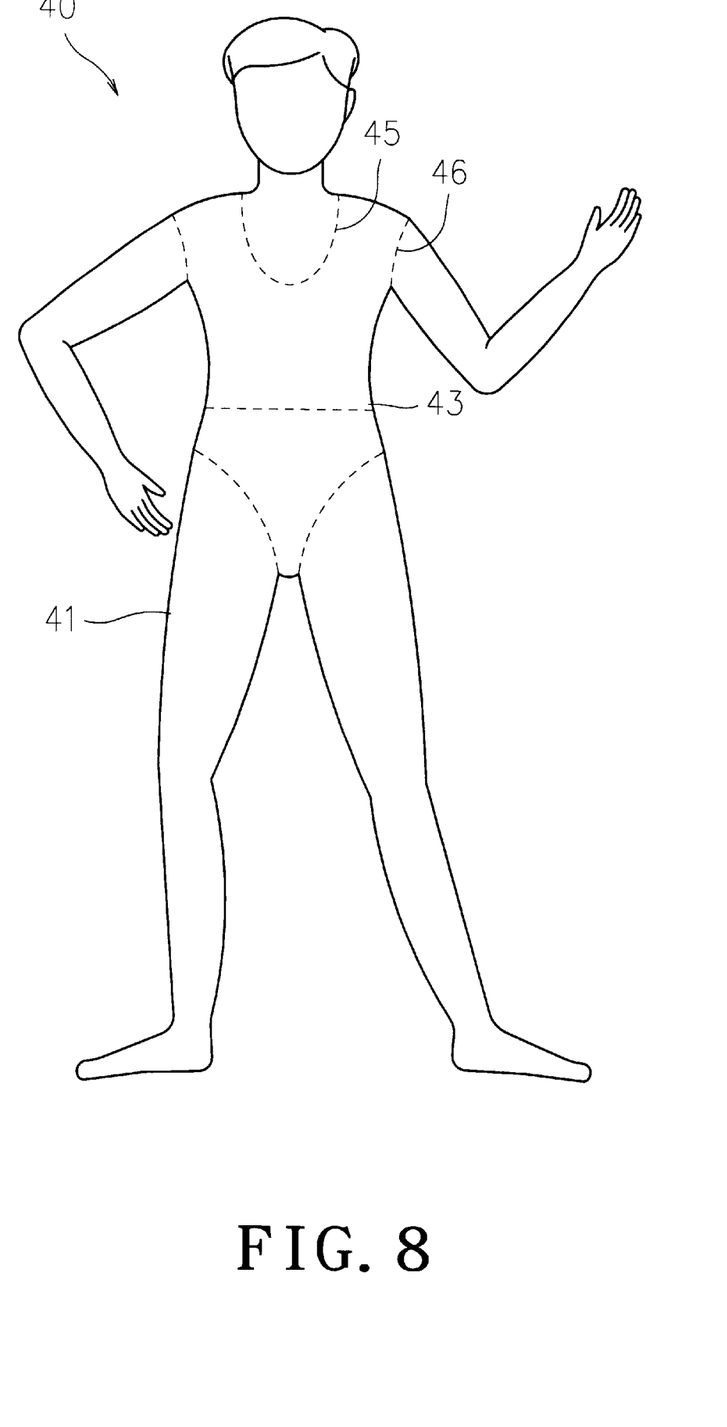
FIG. 8 is a diagrammatic view illustrating a position on a model for locating the connecting device of the present invention.

Referring to FIG. 8 and accompanying with FIG. 2 further, the resilient device 10 and the post device 20 can be performed to join together at any part of the model 40 such as the chest part 45, the arm 46, the thigh part 41, and the waist part 43 shown in FIG. 8. The dividing line is not limited to the straight line as the conventional art does, and, for instance, a curve dividing line can be arranged at a high position for the thigh part 41 in case of an exhibition of swimming trunks or the underwear to avoid an unpleasant exposed dividing line. By the same token, a lower curve dividing line at the chest part 45 so as to exhibit a low dress. It is appreciated that the present invention provides an easy way to perform the assembly job and the disassembling job to decrease the labor resulting from the assembling job and disassembling job. Once the resilient device 10 and the post device 20 are out of order, new parts can be replaced as soon as the screws 50 are unfastened instead of the whole arm, the leg part or the whole body being delivered for repair. Hence, the connecting device of the present invention not only is easily repaired but also can provides a lower be the repair cost. Comparing to the traditional model, in which the connecting part is engaged by way of screws 92 or a pure post 90, the present invention provides the inventive step and the novelty from the aspects of convenience and firmness.

While the invention has been described with reference to preferred embodiments thereof, it is to be understood that modifications or variations may be easily made without departing from the spirit of this invention, which is defined by the appended claims.

What is claimed is:

1. A connection apparatus for an artificial model, comprising a resilient device being fixedly attached to a first joining part of the artificial model and a post device being fixedly attached to a second joining part of the artificial model; wherein the resilient device further comprises a hollow shaft extending inward the first joining part, a sleeve being disposed surrounding a periphery of the hollow shaft and the post device further comprises a post extending outward the second joining part for detachably engaging with the hollow shaft; characterized in that an upper cover is disposed above the hollow shaft and engaged to the hollow shaft by means of an engaging device, which further comprises two hook pairs oppositely extending from a top of the hollow shaft, each of the hook pairs having two upright parallel engaging sticks with a gap in between for locating a screw and the respective engaging stick having a hook end opposite to each other; and two engaging holes disposed in the upper cover corresponding to the hook pairs, each of the engaging holes being arranged with a step therein for the respective hook end; and further a push lever is slidably disposed between the upper cover and the push lever has two neck parts resting on the sleeve and a slant part next to the two neck parts respectively; whereby, once the push lever is push to move aside, the slant parts actuate the sleeve downward to release the upright post from the hollow shaft.

2. The connection apparatus for an artificial model according to claim 1, wherein the push lever at a middle section thereof has two opposite flat planes with respect to a longitudinal axis thereof and the upper cover provides a fitting part corresponding to the flat planes to prevent the push lever from rotation.

3. The connection apparatus for an artificial model according to claim 1, wherein both the upper cover and the sleeve provide a curve recess corresponding to the neck parts of the push lever respectively for being accommodated with the neck parts.

4. The connection apparatus for an artificial model according to claim 1, wherein the hollow shaft provides a curve recess corresponding to a position of the push lever to be away from a movement area of the push lever.

5. The connection apparatus for an artificial model according to claim 1, wherein the push lever at an end thereof engaging with a bolt for a movement of the push lever being adjustable.

6. The connection apparatus for an artificial model according to claim 1, wherein the sleeve at an inner wall surface thereof has a plurality of longitudinal ribs and the hollow shaft at an outer wall surface thereof has a plurality of longitudinal recesses for joining the ribs to prevent the sleeve from a relative rotation with respect to the hollow shaft.

* * * * *